United States Patent [19]

McAleavey

[11] Patent Number: 5,346,385
[45] Date of Patent: Sep. 13, 1994

[54] CHILLED ROLLER APPARATUS FOR ACHIEVING DESIRED SURFACE ROUGHNESS CHARACTERISTICS OF AN ELECTRODE MATERIAL ON A WEB

[75] Inventor: Mike McAleavey, San Jose, Calif.

[73] Assignee: Valence Technology, Inc., San Jose, Calif.

[21] Appl. No.: 968,370

[22] Filed: Oct. 29, 1992

[51] Int. Cl.⁵ .................. B29C 53/84; B29C 59/04
[52] U.S. Cl. ........................ 425/363; 425/224; 425/115; 425/373; 425/447; 118/44; 118/101; 118/117
[58] Field of Search ................ 118/44, 101, 106, 117, 118/118, 122, 123, 211, 212, 223, 235, 229; 425/224, 447, 113, 115, 373, 371, 363

[56] References Cited

U.S. PATENT DOCUMENTS

| | | | |
|---|---|---|---|
| 2,442,443 | 6/1948 | Swallow | 425/373 |
| 2,591,240 | 4/1952 | Ditto et al. | 118/101 |
| 2,598,866 | 6/1952 | Warp | 118/101 |
| 2,813,506 | 11/1957 | Johnston | 118/101 |
| 2,829,980 | 4/1958 | Redd | 118/101 |
| 2,944,586 | 7/1960 | Yanulis | 425/115 X |
| 3,124,480 | 3/1964 | Mahoney et al. | 118/101 |
| 3,241,182 | 3/1966 | Kessler | 425/373 X |
| 3,470,055 | 9/1969 | Wade | 425/115 X |
| 3,594,865 | 7/1971 | Erb | 425/115 X |
| 3,709,647 | 1/1973 | Barnhart | 425/224 |
| 4,012,188 | 3/1977 | Lemelson | 425/373 |
| 4,389,182 | 6/1983 | Gersbeck | 425/373 X |
| 4,830,939 | 5/1989 | Lee et al. | 429/192 |
| 4,925,751 | 5/1990 | Shackle et al. | 429/191 |

Primary Examiner—Michael Ball
Assistant Examiner—Francis J. Lorin
Attorney, Agent, or Firm—Robert Krebs

[57] ABSTRACT

An apparatus for achieving desired surface roughness characteristics on an electrode material that is coated on a substrate such that the electrode material has desired surface roughness characteristics includes a roller. The roller has surface roughness characteristics corresponding to those desired in the electrode material. The apparatus includes a device for rotating the roller. The apparatus presses electrode material coated on a substrate against the surface of the roller so that the electrode material assumes substantially the same roughness characteristics as the surface of the roller. A nip roller is used to press the electrode material against the surface of the roller, the position of the nip roller being movable to adjust the thickness of the electrode material. A refrigeration apparatus is provided to cool the roller to a casting temperature for casting electrode material that has been pressed against the roller.

24 Claims, 3 Drawing Sheets

CHILLED ROLLER APPARATUS FOR ACHIEVING DESIRED SURFACE ROUGHNESS CHARACTERISTICS OF AN ELECTRODE MATERIAL ON A WEB

BACKGROUND OF THE INVENTION

1. Field of the Invention

The present invention relates to chilled rollers and, more particularly, to a chilled roller adapted for use in achieving desired surface roughness characteristics of an electrode material on a conductive substrate material.

2. State of the Art

It has been recently proposed to form a laminate that includes a conductive substrate material and an electrode material that is coated directly onto the substrate material for use in batteries. Such a laminate has a particular application in batteries of the type having a polymer electrolyte disposed between sheet-like anodes and cathodes. The substrate material is usually a conductive web material, such as a nickel, aluminum, or copper web material.

SUMMARY OF THE PRESENT INVENTION

The present invention generally relates to chilled rollers adapted for use in achieving desired surface roughness characteristics of an electrode material on a conductive substrate material. In accordance with the present invention, the electrode may comprise a paste including a vanadium oxide ($V_6O_{13}$ or $V_3O_8$) material, which serves as a cathode in the battery to be constructed. The paste is then coated on the substrate material to a desired thickness with a plate and roller system. The substrate material coated with electrode material is then cured in an electron beam apparatus.

Next, a polymer mixture for forming an electrolyte material in the battery to be formed is coated over the cured electrode material by a knife and blade system. The polymer electrolyte material is also cured in an electron beam apparatus. An electrode, having a polarity opposite to that of the electrode material that is coated directly on the substrate, is laminated or otherwise positioned on top of the electrolyte material to form an electrochemical cell.

The uncured electrolyte material is sufficiently viscous to be described as "self-leveling." In other words, the uncured electrolyte material is able to flow in order to fill any valleys in the electrode material and thereby form a flat surface of the laminate, substantially regardless of the roughness of the electrode material over which the electrolyte material is coated. In view of this characteristic of the uncured electrolyte material, it is desirable to keep the electrode layer onto which the self-leveling electrolyte material is coated as flat as possible. If certain areas of the electrode layer are raised above other areas, and the self-leveling electrolyte material is coated over this uneven electrode layer, the thickness of the electrolyte material may be diminished in certain areas. Therefore, when the opposite polarity electrode material is applied on the flat surface of the electrolyte material, less electrolyte material will separate the two electrodes at certain points than at other points. If the electrolyte material present at a particular point between the two electrodes is sufficiently thin, it is possible that excessive ion flow through the electrolyte from the anode to the cathode will occur at this point of least impedance and cause the electrochemical cell to short.

In accordance with one aspect of the present invention, an apparatus for casting an electrode material on a substrate includes a) a roller, an exterior surface of the roller having a desired surface roughness, b) means for rotating the roller, c) means for pressing electrode material coated on a substrate against the surface of the roller so that the electrode material assumes substantially the same roughness characteristics as the surface of the roller, and d) means for cooling the roller to a casting temperature for casting electrode material that has been pressed against the roller.

In accordance with a further aspect of the present invention, a method of forming a laminate on a substrate material for forming an electrochemical cell comprises the steps of a) pressing electrode material coated on a substrate against a roller such that the electrode material obtains a roughness substantially the same as a roughness of the roller, b) holding the pressed electrode material in contact with the roller through an arc of the roller, c) cooling the roller such that the pressed electrode material becomes cast from contact with the roller, and d) directing the cast electrode material on the substrate out of contact with the roller.

BRIEF DESCRIPTION OF THE DRAWINGS

The features and advantages of the present invention will be well understood by reading the following detailed description in conjunction with the drawings in which like numerals indicate similar elements and in which.

BRIEF DESCRIPTION OF THE PREFERRED EMBODIMENTS

Figure 1:
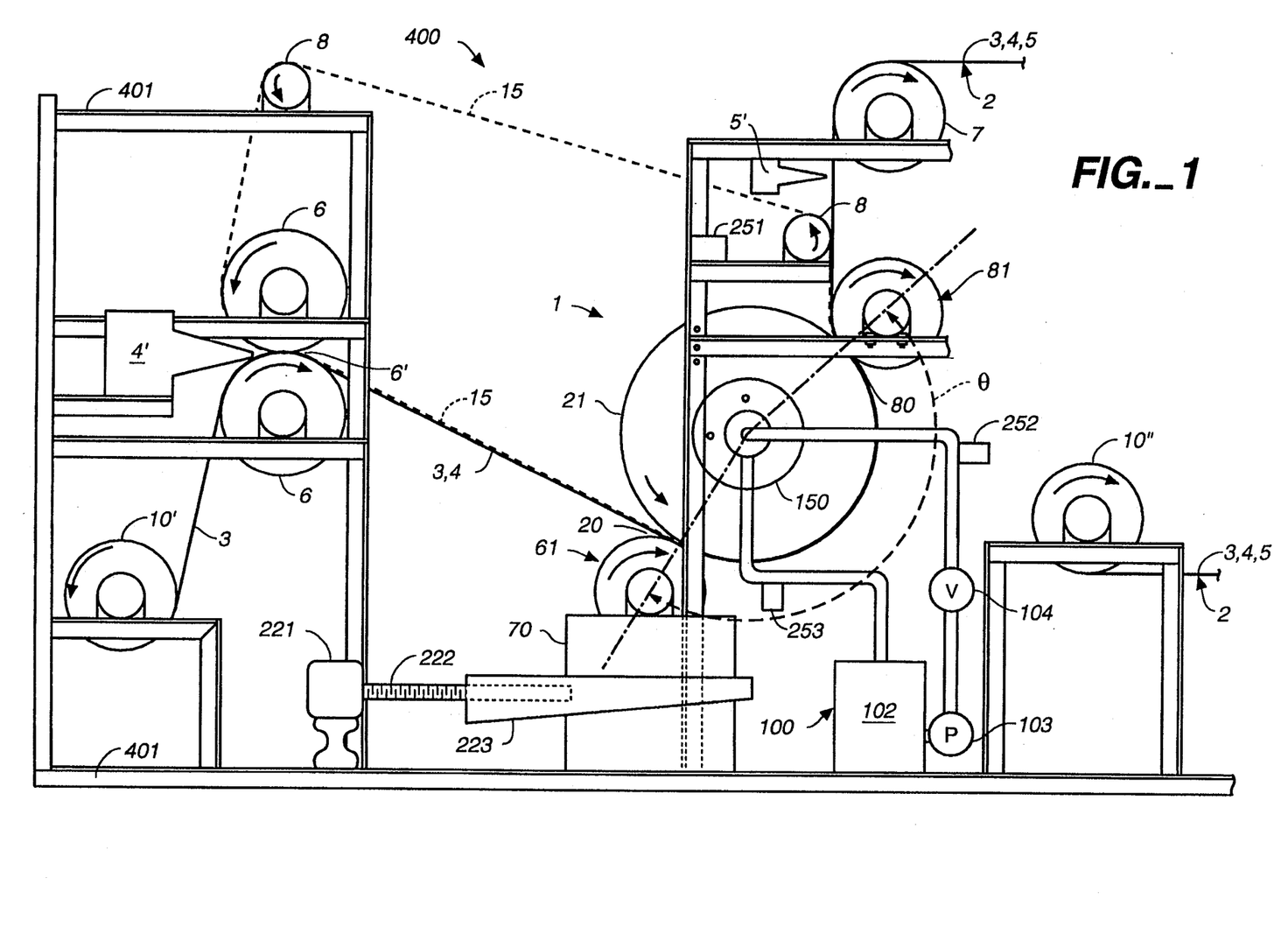
FIG. 1 is a schematic side view of a portion of an apparatus for forming a laminate for forming an electrochemical cell, including a portion of an apparatus for casting an electrode material on a conductive web substrate according to an embodiment of the present invention.

In FIG. 1, a portion of an apparatus 400 for forming a laminate 2 that includes a web of conductive substrate material 3 (hereinafter "web"), a layer of electrode material 4, supplied from a reservoir 4' and coated on the web material, and a layer of electrolyte material 5, supplied from a reservoir 5' and coated on the layer of electrode material. The layer of electrode material 4 is coated onto the web material 3 that is fed from an unwinding roller 10' and the web and electrode material are pressurized in a nip 6' between pressing rollers 6 to form a fairly even layer of electrode material over the web. U.S. Pat. No. 4,830,939 and U.S. Pat. No. 4,925,751, describe a preferred electrode material 4 (preferably a cathode paste material that is coated on one surface of the web 3) and a preferred web material (preferably a nickel web material, although aluminum or copper webs may also be used). As the web 3 coated with the electrode material 4 leaves a nip 6' between the pressing rollers 6, the layer of electrode material has a particular mean average thickness. However, the surface of the layer may also be characterized by undesirable peaks and valleys of electrode material 4.

Figure 2:
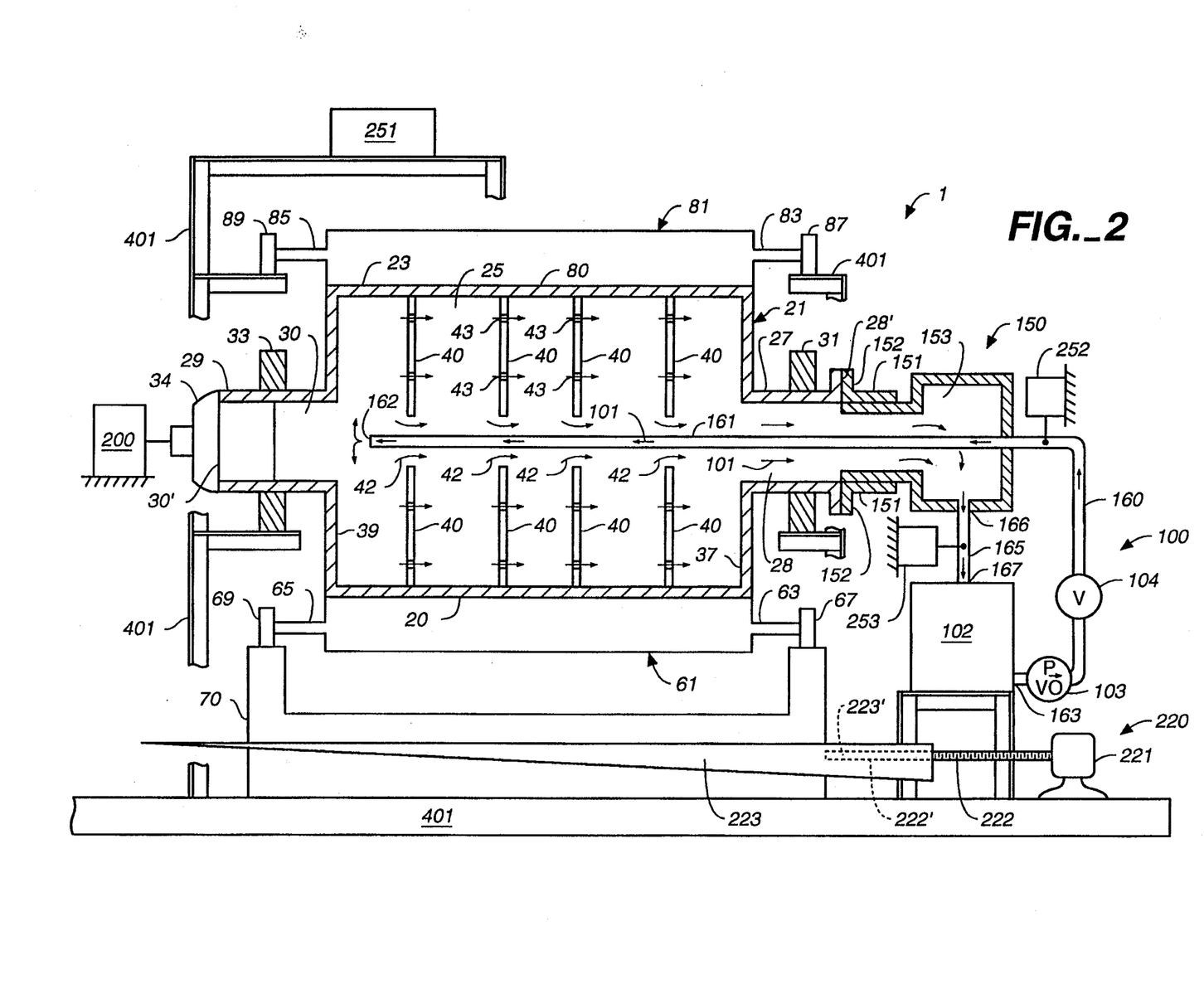
FIG. 2 is a schematic, partially cross-sectional front view of a portion of an apparatus for casting an electrode material on a conductive substrate according to an embodiment of the present invention.
Figure 3:
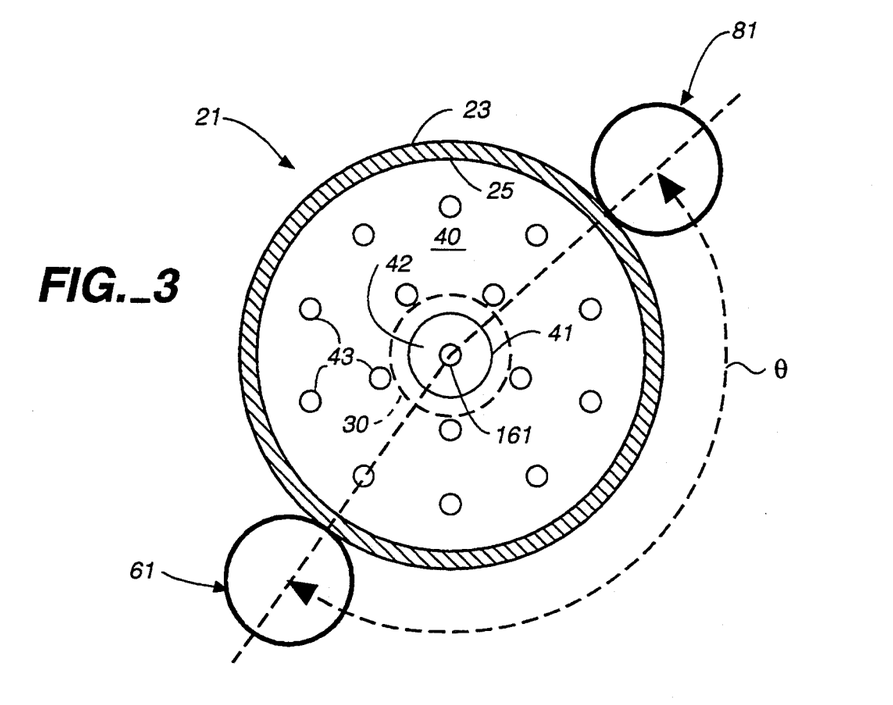
FIG. 3 is a schematic, partially cross-sectional side view of a portion of an apparatus for casting an electrode material on a conductive substrate according to an embodiment of the present invention.

The laminating apparatus 400 includes an apparatus 1, shown in FIGS. 1, 2, and 3, for casting the electrode material 4 on the conductive web 3. The casting apparatus 1 includes a roller 21 which is cooled or chilled as described below. The web 3 coated with electrode material 4 is fed through a nip 20 between the chilled roller 21 and a nip roller 61 such that the side of the web that is coated with electrode material faces the chilled roller. The electrode material 4 on the web 3 is pressed against the chilled roller 21 by the nip roller 61 with a predetermined force. The electrode material 4 on the web 3 is held against the chilled roller 21 through a predetermined arc $\theta$ around the exterior 23 of the chilled roller 21. The arc $\theta$ is measured between the nip 20, between the chilled roller 21 and the nip roller 61, and a nip 80, between the chilled roller and a redirecting roller 81. The web 3 is under a predetermined longitudinal tension that may be maintained by means for maintaining web tension including the unwinding roller 10' and a winding roller 10". Tension in the web 3 is preferably maintained at approximately 3–5 lbs/linear inch and the means for maintaining web tension, including the unwinding roller 10' and the rewinding roller 10", facilitates holding the electrode material 4 on the web 3 against the chilled roller 21 through the arc $\theta$. After the web 3 is held against the chilled roller 21 through the arc $\theta$, electrolyte material 5 is applied to the web, and the web continues on through the rest of the apparatus 400 for forming a laminate 2. Normally, the web 3 is passed over additional redirecting rollers 7 and through an electron beam curing structure (not shown) in which the electrode material 4 and the electrolyte material 5 are cured together. The web 3, the electrode material 4, and the electrolyte material 5 are subsequently cut or folded or otherwise processed and attached to an opposite polarity electrode material to form a battery (not shown).

The exterior 23 of the chilled roller 21 has a predetermined roughness. When the electrode material 3 is pressed against the chilled roller 21 in the nip 20, and held, in tension, against the chilled roller through the arc $\theta$, and, if desired, pressed against the chilled roller in the nip 80, the mean average thickness of the electrode material remains substantially the same and the surface of the layer is shaped to attain substantially the same roughness as the portion of the chilled roller with which it is in contact.

The chilled roller 21 is provided with means 100 for cooling the chilled roller. The cooling means 100 facilitates preventing the electrode material 4 from adhering to the chilled roller 21 when the web 3 and electrode material exit the nip 80. Contact of the electrode material 4 with the exterior 23 of the chilled roller 21 cooled by the cooling means 100 cools the electrode material sufficiently such that it has characteristics of being "cast," "set," or "frozen", hereinafter referred to as "cast." In the cast condition, the electrode material 4 has characteristics including being more likely to adhere to the web 3, and not to the chilled roller 21, and the surface of the layer of electrode material retains substantially the same roughness characteristics (i.e., smooth and even) that it acquired while being pressed against the chilled roller and held against the chilled roller. It is presently understood that compressing the electrode material 4 on the web 3 against the exterior 23 of the chilled roller 21 between the nip 20 of the nip roller 61 forces the electrode material to assume the roughness characteristics of the exterior of the chilled roller and that holding the electrode material on the web in contact with the chilled roller at a sufficiently low temperature, through the arc $\theta$, and under tension causes the electrode material to retain the roughness characteristics of the exterior of the chilled roller.

The chilled roller 21 is provided with a highly polished exterior 23, thereby facilitating reduction of the magnitude of the peaks and valleys on the surface of the layer of electrode material 4 while retaining substantially the same mean average thickness of electrode material as when the web 3 and electrode material exit the pressing rollers 6. The chilled roller 21 is preferably formed from a hard material capable of being polished to obtain, and capable of retaining, a highly smooth exterior 23. Stainless steel has been found to be among the materials capable of providing such characteristics.

With reference to FIG. 1, after the web 3 and the electrode material 4 exit the nip 80, electrolyte material 5 is coated over the electrode material. The preferred electrolyte material 5 is self-leveling so that the outer surface of the electrolyte material, by flowing to fill valleys due to surface imperfections in the electrode material 4, forms a substantially flat surface. The electrolyte material 5 is preferably applied by means 5' for applying the electrolyte material such as a doctor blade. By minimizing the amplitude of the peaks and valleys of the electrode material 4, it is possible to attain a highly consistent, uniform thickness of the electrolyte material 5 over the electrode material. The electrode material 4 and the electrolyte material 5 on the web 3 may both be cured by a single curing means 13, preferably an electron beam apparatus (not shown), in a single curing step. Thereafter, the laminate 2 may be wound onto the windup roller.

It is possible to further inhibit the electrode material 4 from adhering to the chilled roller 21, to attain minimal roughness on the surface of the electrode layer, and to partially compensate minor surface imperfections on the exterior 23 of the chilled roller by use of an endless belt or web of material 15, shown in FIG. 1 in dashed lines. The web or endless belt 15 has a highly smooth surface, preferably a material such as the plastic material. For example, a product available under the name TEFCEL ™, available from DuPont, may be suitable. The web or endless belt 15 is interposed between the chilled roller 21 and the electrode material 4. Preferably, the endless belt or web of material 15 is wound around one of the pressing rollers 6 and around one or more redirecting rollers 8 and contacts the electrode material 4 from the nip 6' between the pressing rollers. The endless belt or web of material 15 is preferably redirected away from the web 3 and the electrode material 4 by a redirecting roller 8 at or after the nip 80 between the chilled roller 21 and the redirecting roller 81 and prior to the application of electrolyte material 5. When the electrode material 4 on the web 3 is pressed and held against the endless belt or web of material 15, the surface of the layer of electrode material attains substantially the same surface roughness as the surface of the endless belt or web of material. To the extent that electrode material 4 adheres to anything, it adheres to the endless belt or web of material 15, rather than the chilled roller 21. The endless belt or web 15 can be cleaned of adhering electrode material 4 at a point (not shown) distant from the chilled roller 21.

As noted above, cooling means 100, shown in FIGS. 1, 2, and 3, is provided to cool the chilled roller 21 to a sufficiently low temperature such that the electrode material 4 is in an essentially cast condition when the web 3 and electrode material exit the nip 80. Chilled roller 21 exterior 23 temperatures of between $-20°$–$0°$ C. have been found to be generally effective in casting known formulations of electrode material 4. Lower temperatures, including temperatures as low as $-70°$ C., may be used to ensure that electrode material 4 formulations attain desired cast characteristics. The web 3 and electrode 4 materials are generally quite thin (approximately 0.33 mils and 4.0 mils, respectively) and have little mass per unit of length, whereas the chilled roller 21 is comparatively quite massive. Consequently, the refrigeration capacity required to cast the electrode material is relatively insignificant compared to the refrigeration capacity required to maintain the chilled roller at a particular temperature.

The chilled roller 21 is formed with a hollow interior 25 into which a coolant 101 may be pumped from a chiller means 102. The coolant 101 may be one of any number of known coolant mixtures. At higher temperatures, a mixture of ethylene glycol and water. The chilled roller 21 is further formed with a pair of axle portions 27 and 29 for supporting the chilled roller with bearings 31 and 33. The bearings 31 and 33 may be connected to a rigid frame (not shown). At least one of the axle portions 27 has a hollow interior 28 and an open end 28' for allowing communication between the interior 25 of the chilled roller 21 and the outside.

A union 150 for connecting the interior 25 of the chilled roller 21 to the chiller means 102 is mounted on the open end 28' of the axle portion 27. The union 150 includes a portion 151 for being fastened at the open end 28' of the axle portion 27 and that is rotatable relative to the rest of the union so that, as the chilled roller 21 rotates, the rotating portion 151 turns with the chilled roller and the remainder of the union 150 and the cooling means 100 to which it is connected may remain stationary. The rotating portion 151 may be fastened to the open end 28' by known means, such as with flanges 152 or with interiorly and exteriorly threaded portions (not shown) of the axle portion 27 and the rotating portion 151. The union 150 may include the "Cartridge Water Union" manufactured by Deublin Company. Such a union 150 facilitates the use of a single point on the chilled roller 25 for entry and exit of coolant 101. The coolant 101 is pumped into the chilled roller 21 from the chiller means 102 through the union 150, flows through the chilled roller, and flows back to the chiller means from the chilled roller through the union.

A portion 161 of a coolant supply line 160 extends through the union 150 and into the chilled roller 21. Chilled coolant 101 enters the coolant supply line 160 at an inlet end 163 of the coolant supply line from the chiller means 102. An outlet end 162 of the supply line 160 is preferably positioned near the end 39 of the interior 25 of the chilled roller 21 so that coolant 101 flows back through the interior of the chilled roller toward the other end 37 of the interior of the chilled roller. The coolant 101 then flows out of the chilled roller 21 through the interior 28 of the axle 27 and through an outlet channel 153 in the union 150. From the outlet channel 153, the coolant flows to the chiller means 102 through an outlet line 165 that is connected, at one end 166, to the union 150 and, at another end 167, to the chiller means.

While the above-described union 150 facilitates using only a single point on the chilled roller 21 for entry and exit flow of coolant, it is also possible to arrange for coolant entry and exit flow at two separate points on the chilled roller (not shown). For example, coolant 101 might enter the chilled roller 21 through a rotating union mounted at the open end 28' of the hollow portion 28 of the axle 27 and exit through a rotating union (not shown) mounted at an open end 30' of a hollow portion 30 of the axle 29.

Normally, the axle 29 has a hollow portion 30 with an open end 30' that is closed with a plug 34 or has a solid end (not shown). For rotating the chilled roller 21, means 200, which may include, for example, the bearing 33, are provided such that a portion of the axle 29 or the plug 34 engages the rotating means. The rotating means 200 preferably includes a variable speed electric motor (not shown) and a gear assembly (not shown), however a belt and pulley assembly (not shown) or a chain and sprocket assembly may also be used.

Figure 4:
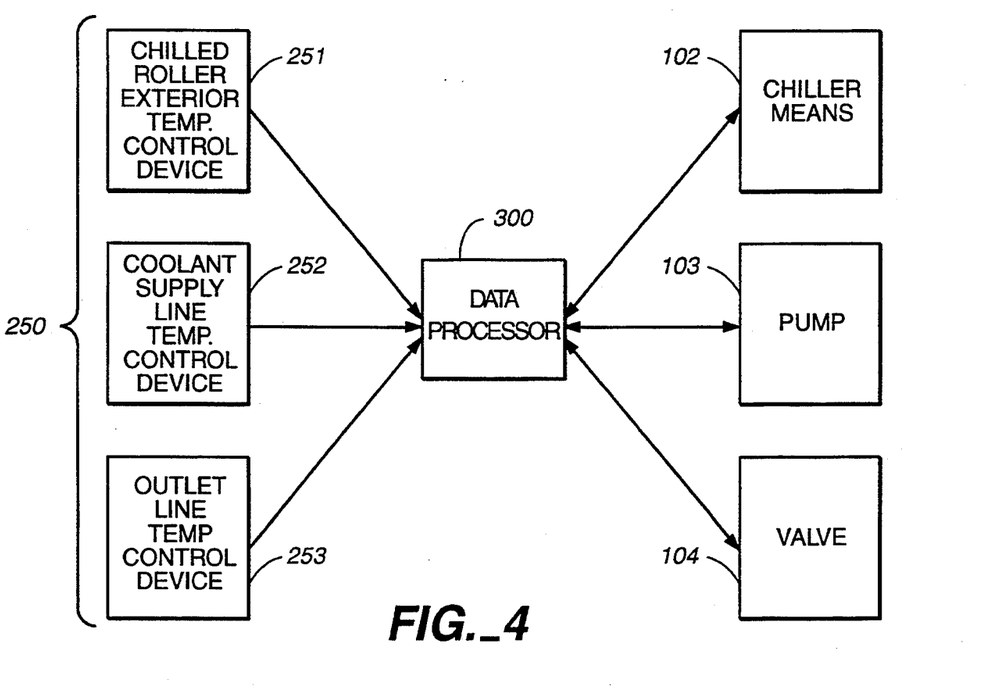
FIG. 4 is a block diagram of a chilled roller and coolant temperature control system according to an embodiment of the present invention.

The chiller means 102 may be any conventional refrigeration apparatus adapted to cool the coolant 101 to the above-noted desired temperatures. Normally, the chiller means 102 includes a chamber (not shown) for holding coolant 101 and a means for refrigerating the coolant (not shown). The refrigeration means preferably includes a conventional evaporator (not shown). The evaporator may be immersed in the coolant or arranged around the chamber, out of contact with the coolant, for cooling the coolant while it is in the chamber.

A pump 103 is provided, either integrally with the chiller means 102 or in the coolant supply line 160, preferably near the inlet end 163, to pump cooled coolant 101 from the chiller means 102 to the chilled roller 21. A valve means 104 may be provided in the coolant supply line 160 after the pump 103 so that the flow rate of coolant 101 from the chiller means 102 to the chilled roller 21 can be adjusted to permit more or less heat dissipation in the chilled roller, as necessary. The valve means 104 is preferably electronically controllable to open or close to various degrees in response to electric signals. The pump 103 may, if desired, be a metering pump that is adapted to pump more or less fluid in response to electric signals. The chiller means 102 may be provided with a thermostat (not shown) to ensure that coolant 101 in the chiller means is always maintained below a selected maximum temperature. The chiller means 102 is selected such that it has sufficient refrigeration capacity to properly cool all of the coolant 101 that is expected to flow through the chiller means to desired coolant temperatures to achieve desired chilled roller 21 temperatures.

The cooling means 100 may be an open system, i.e. the coolant 101 is, at some point in the system, exposed to atmospheric pressure and temperature, or, preferably, a closed system. When the cooling means 100 is expected to provide coolant at lower temperature ranges, a closed system is preferred because such a system facilitates preventing the formation of frozen coolant due to exposure to the atmosphere. Further, a closed system is more readily completely insulated and thereby permits greater energy savings. On the other hand, an open system may be preferred if it is not necessary to operate at lower temperature ranges because such a system facilitates removal of air pockets trapped in the system through normal operation of the system. By contrast, in a closed system, some additional means (not shown) for purging the system of air should be provided. A nitrogen gas purge may, for example, be employed to eliminate air pockets.

The interior 25 of the chilled roller 21 is provided with one of more baffles 40 to provide obstacles to flow of coolant through the chilled roller. By slowing the flow of coolant 101 through the chilled roller 21, the baffles 40 facilitate greater heat dissipation by the chilled roller per gallon of coolant flow. The baffles 40 may be formed from plates shaped to have an exterior periphery of the same shape as the interior periphery of the interior 25 of the chilled roller 21. The baffles 40 are secured to the interior 25 of the chilled roller 21 at desired positions, preferably by welding. The baffles 40 are formed with central through holes 41 through which the portion 161 of the coolant supply line 160 extends. The interior size of the central through hole 41 and the exterior size of the portion 161 of the coolant supply line 160 are determinative of the size of an annular area 42 through which coolant 101 flows back toward the chiller means 102 and is selected to form an annular area with a desired size depending on the required coolant flow and the size of the chilled roller, among other factors. The baffles 40 may also be formed with a number of through bores 43 at various points so that coolant 101 can flow back toward the chiller means 102 through the through bores 43 as well as through the annular area 42. The degree to which coolant 101 flow is obstructed by the baffles 40 is a function of factors including the size and quantity of the through bores 43 and the size of the annular area 42 corresponding to each baffle.

As coolant 101 flows through the chilled roller 21, the temperature of the exterior 23 of the chilled roller fairly steadily rises toward the end 37 of the chilled roller at which the coolant exits the chilled roller as the coolant is heated by contact of the exterior of the roller with the atmosphere. At the exterior 23 of the chilled roller 21, higher temperatures may occur near positions where baffles 40 are arranged on the inside of the chilled roller than in immediately surrounding areas of the exterior which are in contact with coolant, at least when the chilled roller is being initially cooled. Consequently, when it is known that particular width webs 3 are intended to be coated with electrode material 4 and the electrode material will be cast on the chilled roller 21, it is desirable to position the baffles 40 sufficiently far apart from one another such that at least one pair of baffles is farther apart than the particular width of the web to be used. So arranging the baffles 40 permits avoiding running a web 3 having electrode material 4 coated on it over a portion of the exterior 23 of the chilled roller 21 that may not be cooled sufficiently to properly cast the electrode material because of the presence of a baffle inside of the chilled roller.

As noted above, the electrode material 4 on the web 3 is pressed against the chilled roller 21 in the nip 20 between the nip roller 61 and the chilled roller. The nip 80 between the redirecting roller 81 and the chilled roller 21 may also be set such that the electrode material 4 is pressed against the chilled roller. However, there is generally no need for significant pressure between the redirecting roller 81 and the chilled roller 21. The redirecting roller 81, nonetheless, is positioned relative to the chilled roller 21 such that, when the web 3 and electrode material 4 are passed between the redirecting roller and the chilled roller, an endpoint on the arc $\theta$ through which the electrode material on the web is held in contact with the chilled roller 21 is defined by the nip 80. Further, the redirecting roller 81 provides a means for modifying the direction of travel of the web 3 by turning the web through a desired angle on the redirecting roller. The redirecting roller 81 may, if desired, be entirely omitted from the casting apparatus 1 if it is not necessary to achieve desired casting characteristics by pressing the electrode material 4 on the web 3 against the chilled roller 21 a second time, and if it is not necessary to redirect the web with cast electrode material to a further portion of the laminating apparatus 400 by at least partially winding the web around the redirecting roller. Normally, however, it is preferred to utilize the redirecting roller 81, at least to minimize the dimensions of the laminating apparatus 400 by redirecting the web 3 coated with electrode material 4 to a subsequent station in the laminating apparatus after holding the electrode material coated on the web against the chilled roller 21 through the arc $\theta$.

The nip roller 61 and the redirecting roller 81 may be any suitable size, but both are generally smaller in diameter than the chilled roller 21. As with the chilled roller 21, the nip roller 61 and the re, directing roller 81 are each preferably formed from a material having high hardness, such as stainless steel. Further, as with the exterior 23 of the chilled roller 21, the exteriors of the nip roller 61 and the re, directing roller 81 are preferably highly polished for smoothness to avoid surface imperfections on the nip roller or the redirecting roller which might permit variations in the thickness of electrode material 4 on the web 3 or which might deform the surface of the web in contact with the nip roller and the redirecting roller.

One or both of the nip roller 61 and the redirecting roller 81 are preferably provided with means (not shown) for repositioning the nip roller or the redirecting roller relative to the chilled roller 21 to alter the length of the arc $\theta$. The repositioning means may, for example, include a frame member 70 for individually supporting the nip roller 61 or the redirecting roller 81 and a frame 401 of the laminating apparatus 400, the frame member being fastenable at various positions on the frame by, for example, bolts and nuts such that the nip roller or the redirecting roller are in particular positions relative to the chilled roller 21. The frame 401 of the laminating apparatus 400 may be provided with a series of bolt holes (not shown) for repositioning the frame member 70.

The nip roller 61 has a pair of axles 63 and 65 at opposite ends of the nip roller. The axles 63 and 65 are supported by bearing means 67 and 69, respectively. Similarly, the redirecting roller 81 has a pair of axles 83 and 85 at opposite ends of the redirecting roller, and the axles are supported by bearing means 87 and 89, respectively. The bearing means 67, 69, 87, and 89 are preferably individually supported on frame members 70 mounted at particular positions relative to the frame 401.

The nip roller 61 and the redirecting roller 81 rotate in rotational directions opposite to that of the chilled roller 21. The tangential velocity of the exterior 23 (circumference) of the chilled roller 21 is substantially the same as the tangential velocity of the exterior of both the nip roller 61 and the redirecting roller 81, as well as being substantially the same as the linear velocity of the web 3 as it moves past the rollers. It is preferred that the nip roller 61 and the redirecting roller 81 be idle rollers and not driven. It is, however, possible to cause the nip roller 61 and the redirecting roller 81 to rotate under driving action of the rotating means 200 which may, to this end, include gearing mechanisms (not shown) or belt and pulley assemblies (not shown) or chain and sprocket assemblies (not shown) to ensure that the nip roller 61 and the redirecting roller 81 operate in the proper rotational direction and at the proper speeds.

As noted above, the electrode material 4 on the web 3 is pressed against the chilled roller 21 in the nip 20 between the nip roller 61 and the chilled roller. The pressure with which the nip roller 61 is pressed against the chilled roller 21 is preferably maintained in the range of approximately 80 p.s.i., however, different pressures may be desirable to achieve different cast electrode 4 characteristics. To this end, means 220, shown in FIGS. 1 and 2, for adjusting the pressure of the nip roller 61 against the chilled roller 21 are provided.

The pressure adjusting means 220 preferably permits adjustment of the position of the nip roller 61 relative to the chilled roller 21 to cause greater or lesser pressure in the nip 20 depending upon whether the nip roller is moved closer to or further from the chilled roller. The pressure adjusting means 220 preferably is adapted to accurately adjust the position the nip roller 61 in very small increments. One such means, partially shown in FIGS. 1 and 2, includes a fixed means, such as an electric motor 221, for rotating a threaded bolt 222 relative to the fixed rotating means such that an end 222' of the bolt remains in a single position. The bolt 222 is threaded into an interior threaded bore 223' in a wedge shaped block 223 which is moved inwardly or outwardly in response to the rotation of the threaded bolt 222. The movement of the wedge shaped block 223 raises or lowers the frame 70 which supports at least one of the bearings 67 and 69 on which the nip roller 61 rotates. Such a pressure adjusting means 220 permits minute adjustments in the position of the nip roller 61 to adjust the pressure in the nip 20 between the nip roller and the chilled roller 2 1. The pressure adjusting means 220 may, alternatively, include known hydraulic or pneumatic piston devices (not shown) for engaging and moving a frame supporting the bearings 67 and 69 on which the nip roller 61 rotates. A similar pressure adjusting means may be provided to adjust pressure in the nip 80 between the chilled roller 21 and the redirecting roller 81, should it be desired to press the redirecting roller against the chilled roller to attain particular casting characteristics. The redirecting roller 81 may, alternatively, be supported in a non-adjustable fashion on a frame 70 or 401.

The casting apparatus 1 is provided with a temperature control means 250 for monitoring and controlling the temperature of the chilled roller, the temperature of the coolant 101 in the inlet supply line 160, or the temperature of the coolant in the outlet line 165, or at other desired points. A chilled roller exterior temperature control device 251 is mounted on a frame 401 of the laminating apparatus 400 in a position adjacent the exterior 23 of the chilled roller 21 to measure and control the temperature of the exterior of the chilled roller. A coolant supply line temperature control device 252 may be provided in the coolant supply line 160 to monitor and control the temperature of coolant 101 being supplied to the chilled roller 21. An outlet line temperature control device 253, similar to the coolant supply line temperature control device 252, may be provided in the outlet line 165 to monitor and control the temperature of coolant 101 leaving the chilled roller 21 and returning to the chiller means 102.

As shown in the block diagram of FIG. 4, temperature measurements from the chilled roller exterior temperature measuring device 251, the coolant supply line temperature measuring device 252, and the outlet line temperature measuring device 253, as well as from other temperature measuring devices (not shown) are preferably supplied to a dam processor means 300 for optimizing the power usage necessary to achieve desired casting characteristics. The data processor means 300 may be adapted to provide signals to and receive signals from one or more of the chiller means 102, the pump 103, or the valve 104, in response to temperature measurement data received from the chilled roller exterior temperature control device 251, the coolant supply line temperature control device 252, and the outlet line temperature control device 253 to maintain desired temperatures and to accomplish other functions, such as optimization of power usage. Alternatively, the chilled roller exterior temperature control device 251, the coolant supply line temperature control device 252, and the outlet line temperature control device 253 may send signals directly to the chiller means 102, to cause it to turn on or off, the pump 103, to cause it to operate faster or slower, or to the valve 104, to cause it to open or close further, to maintain desired temperature levels.

The chilled roller exterior temperature control device 25 1 is preferably a known infrared temperature measuring device. The coolant supply line temperature control device 252 and the outlet line temperature control device 253 are preferably known temperature measuring devices of the type that are adapted to be mounted in line with the coolant supply line 160 and the outlet line 165, respectively, and each have a temperature probe in contact with the coolant 101 that flows through them, and which permits the sending of an electrical signal indicative of the instantaneous temperature, or at least indicative of when predetermined minimum or maximum temperatures are reached. The chilled roller exterior temperature control device 251, the coolant supply line temperature control device 252, and the outlet line temperature control device 253 are, further, preferably adapted to signal that a predetermined maximum temperature has been reached and that a predetermined minimum temperature has been reached so that, after known operating conditions have been established, the temperature control devices can be preset for normal operation within an optimal range of temperatures.

In operation, the casting apparatus 1 casts electrode material 4 onto web 3 substantially as follows. The electrode material 4 is deposited on the web 3 near the nip 6' between the rollers 6, and the web having electrode material thereon is transported so that the electrode material is pressed against the chilled roller 21, the chilled roller being at a predetermined casting temperature in the nip 20 between the chilled roller and the nip roller 61, such that the outer surface of the electrode material in contact with the exterior 23 of the chilled roller is formed to substantially the same roughness as the portion of the exterior of the chilled roller with which it is in contact. The electrode material 4 on the web 3 is held in contact with the chilled roller 21 through the arc $\theta$ measured from the nip 20 and the nip 80 between the chilled roller 21 and the redirecting roller and is cooled to a desired temperature to cast the electrode material. The exterior 23 of the chilled roller 21 moves, in a first rotational direction, and exteriors of the nip roller 61 and the redirecting roller 81 move, in the rotational direction opposite to that of the chilled roller, such that the exterior of the chilled roller moves at substantially the same tangential velocity as the exteriors of the nip roller and the re, directing roller. The linear velocity of the web 3 as it contacts the exterior 23 of the chilled roller 21 through the arc $\theta$ is substantially the same as the tangential velocity of the exteriors of the chilled roller, the nip roller 61, and the redirecting roller 81. The web 3 with the cast electrode material 4 is directed away from the chilled roller 21 to subsequent steps for forming a laminate 2.

As noted above, if desired, a web or endless belt of material 15 having more desired roughness characteristics than the chilled roller 21 is interposed between the chilled roller and the electrode material 4 such that the electrode material is pressed to substantially the same roughness as the web or endless belt of material. In accordance with the presently preferred embodiment, the web or endless belt of material 15 is interposed between the chilled roller 21 and the electrode material 4 at least through the arc $\theta$. Preferably, after the web 3 and the electrode material 4 pass through the nip 80 between the chilled roller 21 and the redirecting roller 81, the web or endless belt of material 15 is redirected away from the electrode material. The web or endless belt of material 15 is preferably redirected away from the electrode material 4 prior to application of the electrolyte material 5 by the electrolyte applying means 5'. When the electrode material 4 on the web 3 is pressed against the web or belt of material 15 in the nip 20 between the nip roller 61 and the chilled roller 21, and the electrode material is then held against the web or belt of material through the arc $\theta$, the electrode material attains substantially the roughness characteristics of the web or belt of material.

The foregoing has described the principles, the preferred embodiments, and the modes of operation of the present invention. However, the invention should not be construed as limited to the particular embodiments discussed. Instead, the above-described embodiments should be regarded as illustrative rather than descriptive, and it should be appreciated that variations may be made in those embodiments by workers skilled in the art without departing from the scope of the present invention as defined by the following claims.

What is claimed is:

1. An apparatus for achieving desired surface roughness characteristics on an uncured, paste-like electrode material on a substrate web for forming an electrochemical cell, comprising:

a roller, an exterior surface of the roller being continuous and polished and having a constant surface roughness;

means for rotating the roller;

nip roller means including a nip roller for pressing electrode material coated on the substrate web against the surface of the roller in a nip defined by the nip roller and the roller so that a surface of the electrode material assumes substantially the same roughness characteristics as the surface of the roller, the nip roller means including means for moving the nip roller toward and away from the roller to adjust a thickness of the electrode material;

means for holding the electrode material against the surface of the roller through a desired arc length after the electrode material is pressed against the surface of the roller by the nip roller, the holding means including means for redirecting the substrate web around the roller and for maintaining the substrate web under a substantially constant tension to hold the electrode material against the roller; and means for cooling the roller to a casting temperature for casting the electrode material that has been pressed against and is held against the portion of the roller, the casting of the electrode material causing the electrode material to tend to adhere to the substrate web.

2. The apparatus as set forth in claim 1, wherein the roller has a hollow interior portion.

3. The apparatus as set forth in claim 2, wherein the means for cooling the roller includes means for providing coolant to the interior portion.

4. The apparatus as set forth in claim 3, further comprising means for adjusting the flow of coolant provided by the means for providing coolant.

5. The apparatus of claim 4, further comprising temperature measuring means for measuring the temperature of the roller, the means for adjusting the flow of coolant being responsive to a signal received from the temperature measuring means.

6. The apparatus of claim 3, further comprising means for adjusting the temperature of the coolant provided to the interior of the roller.

7. The apparatus of claim 6, further comprising temperature measuring means for measuring the temperature of the roller, the means for adjusting the temperature of the coolant being responsive to a signal received from the temperature measuring means.

8. The apparatus of claim 3, further comprising baffle means for controlling the rate of flow through the interior portion.

9. The apparatus as set forth in claim 8, wherein the baffle means includes a plurality of plates secured to the interior portion, the plates being formed with central through holes.

10. The apparatus as set forth in claim 9, wherein the plates are further formed with a plurality of through bores.

11. The apparatus as set forth in claim 3, wherein the means for providing coolant include a rotating union.

12. The apparatus as set forth in claim 1, wherein the means for cooling the roller includes an open loop cooling system.

13. The apparatus as set forth in claim 1, wherein the means for cooling the roller includes a closed loop cooling system.

14. The apparatus as set forth in claim 13, wherein the closed loop cooling system includes means for purging air from the system.

15. The apparatus as set forth in claim 1, wherein the rotating means is adapted to rotate both the roller and the nip roller.

16. The apparatus as set forth in claim 1, wherein the holding means is a redirecting roller.

17. The apparatus as set forth in claim 16, wherein the rotating means is adapted to rotate both the roller and the redirecting roller.

18. The apparatus as set forth in claim 17, further comprising means for moving the redirecting roller relative to the roller.

19. The apparatus as set forth in claim 18, further comprising means for permitting movement of the redirecting roller rotationally around the roller.

20. The apparatus as set forth in claim 18, wherein the moving means moves the redirecting roller toward the roller.

21. The apparatus as set forth in claim 1 wherein the moving means includes a movable frame member for mounting the nip roller, a stationary frame member for mounting the roller, a wedge movable between a portion of the movable frame member and the stationary frame member for moving the movable frame member relative to the stationary frame member, the wedge being formed with an internally threaded bore, an axially stationary rod having external threads engaging with the internal threads in the wedge, and means for turning the rod, the turning means being adapted to turn the rod to cause the wedge to move between the portion of the movable frame member and the stationary frame member such that the nip roller is moved toward or away from the roller.

22. An apparatus for achieving desired surface roughness characteristics on an uncured, paste-like electrode material on a substrate web for forming an electrochemical cell, comprising:

a roller;

means for rotating the roller;

nip roller means including a nip roller for pressing electrode material coated on the substrate web against the surface of the roller in a nip defined by the nip roller and the roller so that a surface of the electrode material assumes substantially the same roughness characteristics as the surface of the roller, the nip roller means including means for moving the nip roller toward and away from the roller to adjust a thickness of the electrode material;

interposed means, between the nip roller means and the roller, the interposed means having a continuous, smooth surface against which the electrode material is pressed by the nip roller means such that a surface of the electrode material assumes substantially the same roughness characteristics as the surface of the interposed means;

means for applying an electrolyte material on the electrode material coated on the substrate web;

means for redirecting the interposed means away from the electrode material coated on the substrate web after the pressing means presses the electrode material toward the roller, and the electrolyte applying means being disposed downstream from the means for redirecting the interposed member from the electrode material coated on the substrate web;

means for cleaning the interposed means after it is redirected away from the electrode material coated on the substrate web; and means for cooling the roller to a casting temperature for casting the electrode material that has been pressed against and is held against the portion of the roller, the casting of the electrode material causing the electrode material to tend to adhere to the substrate web.

23. The apparatus as set forth in claim 22, wherein the interposed means includes an endless web of material traveling around the roller.

24. The apparatus as set forth in claim 22 wherein the moving means includes a movable frame member for mounting a nip roller, a stationary frame member for mounting the roller, a wedge movable between a portion of the movable frame member and the stationary frame member for moving the movable frame member relative to the stationary frame member, the wedge being formed with an internally threaded bore, an axially stationary rod having external threads for engaging with the internal threads in the wedge, and means for turning the rod, the turning means being adapted to turn the rod to cause the wedge to move between the portion of the movable frame member and the stationary frame member such that the nip roller is moved toward or away from the roller.

* * * * *